Patented Jan. 16, 1951

2,537,949

UNITED STATES PATENT OFFICE 2,537,949

MODIFIED ALKYD RESINS AND COATING COMPOSITIONS CONTAINING THE SAME IN ADMIXTURE WITH READILY COPOLYMERIZABLE VINYL MONOMERS

Harold E. Adams, Lancaster, Pa., assignor to Armstrong Cork Company, Lancaster, Pa., a corporation of Pennsylvania No Drawing. Application June 6, 1946,
Serial No. 674,933

9 Claims. (Cl. 260—22)

1

The present invention relates to a modified alkyd resin, and a modified alkyd-vinyl monomer resin.

More particularly, this invention relates to a modified alkyd-vinyl monomer resin wherein the alkyd resin is modified to provide a resin composition which is suitable for coating materials, such as metals or the like.

In the art, the so-called "low pressure laminating resins" are composed of vinyl monomers, such as styrene, and an unsaturated alkyd such as that made by esterifying various mixtures of maleic anhydride and adipic acid or sebacic acid with diethylene glycol or other glycol. This type of resin is unsatisfactory as a protective coating due to its poor metal adhesion and the inhibition of its cure by air.

The primary object of this invention is to provide a modified alkyd resin or a modified alkyd-vinyl monomer resin, suitable for coating metals, such as tin, and having desirable and satisfactory adhesive, hardness, flexibility and quick-cure characteristics.

In carrying the present invention into effect, a modified alkyd resin is first prepared. The alkyd resin may be prepared by esterifying a mixture of rosin, maleic anyhdride and linseed oil fatty acids; with a mixture of a glycol such as diethylene glycol, and a polyfunctional alcohol, such as glycerine.

The modified alkyd resin is then mixed with a vinyl monomer, such as styrene, and with a pigment, to provide a very satisfactory protective coating for metals, such as tin plate. The metal coatings thus produced have the remarkably fast drying times of the order of ten minutes, at room temperatures.

In the preparation of the modified alkyd resin, it is preferred to employ rosin, but if desired, resins derived from rosin or including rosin may be substituted. In general, varnish producing resins of the acidic type or the ester type may be substituted for rosin. For example, ester gum, methyl abietate, rosin modified phenolic resins, or other rosin type products may be employed. In other words, a resin selected from the group consisting of rosin and rosin derivatives may be utilized in the preparation of the modified alkyd resin.

Likewise, in place of maleic anhydride, substituted maleic anhydrides, fumaric acid or substituted derivaties thereof, may be employed. It is intended to include other aliphatic unsaturated dicarboxylic acids or their anhydrides as equivalents of the preferred maleic anhydride.

2

As a substitute for linseed oil fatty acids, the following compounds are acceptable: soybean oil fatty acids, perilla oil fatty acids, tung oil fatty acids, cottonseed oil fatty acids, dehydrated castor oil fatty acids, and other fatty acids derived from oils, stearic acid, oleic acid, linoleic acid, linolenic acid, and the like.

As a substitute for diethylene glycol, the following compounds may be used: ethylene glycol, triethylene glycol, tetra-ethylene glycol, propylene glycol, dipropylene glycol, tripropylene glycol, butylene glycol, and the like.

As a substitute for glycerine: pentaerythritol, sorbitol, mannitol, or any other polyhydric alcohol having more than two hydroxyl groups, may be employed.

It should be understood that the modified alkyd resin of this invention has desirable coating characteristics. However, it is preferred to combine the modified alkyd resin with a readily copolymerizable vinyl monomer, such as styrene, to shorten the drying time. In this connection, the following compounds may be substituted for styrene: methyl methacrylate, vinyl methacrylate, allyl methacrylate, ethyl acrylate, methyl acrylate, other acrylates and methacrylates, diallyl phthalate, diallyl ether, other allyl compounds, divinyl benzene, and the like. While styrene or methyl methacrylate are preferred, other readily copolymerizable compounds of the vinyl class may be used.

In practice, the preferred percentage composition is two parts by weight of modified alkyd resin combined with three parts by weight of vinyl monomer. Pigments may be added in any desired quantity.

The following examples will serve to illustrate specific embodiments of my invention.

Example I 1200 gms. rosin (FF grade) ____ (approx. 4.0 mole)
600 gms. maleic anhydride ____ (approx. 6.0 mole)
600 gms. linseed oil fatty acids_ (approx. 2.0 mole)
600 gms. diethylene glycol ____ (approx. 6.4 mole)
250 gms. glycerine _____ (approx. 2.2 mole)

Example II

1080–1320 gms. rosin
540–660 gms. maleic anhydride
540–660 gms. linseed oil fatty acids
540–660 gms. diethylene glycol
225–275 gms. glycerine In these examples, the rosin and maleic anhydride are placed in a reaction vessel equipped with a variable speed stirrer, reflux condenser, thermometer and heater. The reflux condenser is preferably equipped with a distilling receiver to collect and measure the amount of water formed in the reaction. The reaction vessel should be equipped with a tube for the introduction of carbon dioxide or nitrogen. This maintains an inert atmosphere and keeps the oxidation reactions to a minimum. An inert atmosphere is desirable when preparing maleic alkyds.

The rosin and maleic anhydride are heated together at 200° C. for three hours. This causes the rosin to condense with the maleic anhydride to form a tribasic acid. An excess of maleic anhydride is desired (in this case, 50% excess) to assure some free maleic anhydride in the alkyd. It is essential to provide some unsaturation in the alkyd so that cross linking by the vinyl compound is possible. At the end of three hours, the linseed oil fatty acids, diethylene glycol and glycerine are added and the temperature raised to 225° C. The mixture is refluxed at this temperature for 5½ hours. At this time, the resin has an acid number of 70. The functionality of the starting mixture is such that it would form a gel if the reaction is carried far enough. Consequently, it is necessary to stop the reaction before this point is reached.

As indicated, the alkyd reaction should not proceed to the formation of a gel. The following physical properties may be used to characterize an alkyd of proper viscosity and acid number, particularly with reference to the use of rosin in the formulations.

Acid number 65±15
Viscosity of 75% solids solution is 20±10 poises (80–20 xylene-methyl alcohol solvent for the resin)

The resin is tack free at room temperatures.

At this stage, the reaction is stopped by slowly adding xylene. The temperature is rapidly reduced due to the refluxing of the xylene. When the temperature has fallen to about 120° C., sufficient methyl alcohol is added to make an 80–20 xylene-methyl alcohol solution with 75% solids.

A masterbatch is made by mixing 400 gms. of the above resin vehicle with 300 gms. of pigment. Sufficient mixing was obtained by means of one or two passes through the tight rolls of a paint mill.

The following pigment formulation is suitable in the preparation of the masterbatch. It contains the following ingredients:

| | Parts by weight |
|---|---|
| Ferrite yellow | 50.5 |
| Magnesium silicate | 44.8 |
| Carbon black | 2.5 |
| Aluminum stearate | 2.2 |

The pigments are mixed dry in a ball mill.

The paint or coating composition is made according to the following formulation:

| | Parts by weight |
|---|---|
| Masterbatch | 264.0 |
| 6% cobalt drier | 3.0 |
| Styrene | 180.0 |
| 80–20 xylene-methyl alcohol | 50.0 |

In order to determine the coating characteristics, "flow-outs" were made on small sections of clean tinplate. One sample was placed in an oven at 185° F. for 30 minutes, another under infra-red heat for two minutes, and a third was left at room temperature under forced draft.

Under the influence of air, the vinyl monomer polymerizes and cross links the alkyd resin, resulting in a very fast drying of the coating composition. It is believed that the presence of the oil fatty acids in the alkyd resin serves to enhance the reaction which occurs and thus makes possible the rapid drying in the presence of air, in contradistinction to the laminating type of resins where the presence of air tends to inhibit polymerization.

The compositions have good coating characteristics. They have the proper viscosity and readily wet the metal. The films were "full hard" for both the oven and infra-red samples while the air-dried sample was "dry to touch" in two minutes and "dry to handle" in ten minutes.

Example I illustrates the preferred composition while Example II illustrates a range of weights of ingredients to provide an acceptable coating.

Example III

The alkyd resin of Example I is cut to 75% solids with 50–50 xylene-methyl alcohol.

The following formulations will illustrate the range of combination of alkyd-vinyl monomer resins.

| | Parts by weight |
|---|---|
| Alkyd resin of Example I cut to 75% solids | 1 |
| Vinyl monomer | 0–3 |

A ratio of two parts of alkyd to three parts of vinyl monomer is the optimum composition for the purpose of providing a coating for metals, such as tin. The alkyd resin alone possesses metal coating properties but has a longer drying time. Increasing the proportion of vinyl monomer tends to shorten the drying time. However, too high a proportion of vinyl monomer dilutes the paint to the point where pigment separation occurs, or the proper film thickness cannot be obtained.

If desired, benzoyl peroxide may be used to catalyze the reaction between the alkyd and the vinyl monomer. Other catalysts may be employed, such as lauroyl peroxide, acetyl peroxide, tertiary butyl hydroperoxide, tertiary butyl perbenzoate, ozone and the like.

It is not necessary to include a catalyst in the alkyd-vinyl monomer reaction. Apparently, the air has enough catalytic effect to polymerize the vinyl monomer. In fact, in some cases it is an advantage to omit the catalyst to extend the working life of the paint. Less reactive compositions need the catalyst to obtain the desired drying time.

Typical specific formulations are as follows:

| gms. Alkyd (75% solids) | gms. Benzoyl Peroxide | gms. 6% Cobalt drier | gms. Methyl Methacrylate | gms. Styrene |
|---|---|---|---|---|
| 25 | 0.5 | 0.5 | 30 | |
| 25 | 0.5 | 0.5 | | 30 |
| 25 | 0.5 | 0.5 | 15 | 15 |

These compositions have very desirable metal adhesion, hardness, and flexibility characteristics.

Example IV 90 gms. rosin (FF) (0.3 mole)
45 gms. maleic anhydride (0.45 mole)
45 gms. linseed oil fatty acids (0.15 mole)
45 gms. diethylene glycol (0.45 mole)
15 gms. pentaerythritol (0.11 mole)

The alkyd resin is prepared by the same procedure outlined in Example I. The rosin and maleic anhydride are heated together at 200° C. for two hours. After adding the fatty acids, glycol and pentaerythritol, the mixture is heated for four hours at 225° C. A total of 7 cc. of water is collected. The alkyd is cut to 75% solids with 50-50 xylene-methyl alcohol.

The following formulations have good coating properties:

| gms. 75% Alkyd | gms. Benzoyl Peroxide | gms. 6% Cobalt drier | gms. Methyl Methacrylate | gms. Styrene |
|---|---|---|---|---|
| 25 | --- | --- | --- | --- |
| 25 | 0.5 | 0.5 | 30 | --- |
| 25 | 0.5 | 0.5 | --- | 30 |

Example V 45 gms. rosin (FF) (0.15 mole)
15 gms. maleic anhydride (0.15 mole)
15 gms. diethylene glycol (0.15 mole)
6 gms. glycerol (0.05 mole)

The same procedure is followed as outlined in Example I. The rosin and maleic anhydride are heated for two hours at 200° C., and the total mixture for 6¾ hours at 225° C. The alkyd is cut to 75% solids with 50-50 xylene-methyl alcohol.

A master batch was made from 200 gms. of 75% solution of alkyd and 150 gms. of pigment, with the same composition as the pigment of Example I.

The following compositions were prepared:

| gms. Masterbatch | gms. Benzoyl Peroxide | gms. 6% Cobalt drier | gms. Methyl Methacrylate | gms. Styrene | gms. 50-50 Xylene CH₃OH |
|---|---|---|---|---|---|
| 44 | 0.5 | 0.5 | 20 | --- | 20 |
| 44 | 0.5 | 0.5 | --- | 20 | 20 |

Omission of the fatty acid reduces the metal adhesion of the film, and materially reduces the flexibility of the coating.

Example VI 266 gms. ester gum
120 gms. maleic anhydride
120 gms. linseed oil fatty acids
120 gms. diethylene glycol
48 gms. glycerol The same general procedure is followed as in Example I.

The ester gum and maleic anhydride are heated for two hours at 200° C. After adding the fatty acid, glycol and glycerine, the batch is heated an additional 3¼ hours at 225° C. The alkyd is cut to 75% solids with 80-20 xylene-methyl alcohol. The final acid number should be about 46. It will be noted that the acid number in Example VI is lower than the final acid number in Example I where rosin is employed. The use of an ester of rosin, as a substitute for rosin, results in a lower acid number for the same degree of esterification.

The master batch is made from the following:

200 gms. of 75% alkyd solution
150 gms. pigment (Example I)
50 gms. 50-50 xylene-methyl alcohol The following samples were made and tested:

| gms. Masterbatch | gms. Benzoyl Peroxide | gms. 6% Cobalt drier | gms. Styrene | gms. 50-50 Xylene CH₃OH |
|---|---|---|---|---|
| 44 | --- | 0.5 | --- | 25 |
| 44 | --- | 0.5 | 40 | 25 |
| 44 | 0.5 | 0.5 | 40 | 25 |

The coating material was very hard and quite flexible with good metal adhesion.

All of the formulations were so made that the number of hydroxyl groups were approximately equal to number of acid groups although this is not necessary it is to be desired. In studying the proportions of constituents that it is possible to use, this fact must be kept in mind.

Alkyds were prepared that had from 0% to 100% of the hydroxyl groups attached to glycerine molecules. Films made using the 0% glycerine did not dry. Increasing the amount of glycerine causes the resin to gel at lower degrees of reaction or higher acid numbers. This is shown by the following results.

| Parts by weight Glycol | Parts by weight Glycerine | Running Time | Acid No. |
|---|---|---|---|
| | | *Hours* | |
| 0 | 110 | 3¼ | 105 |
| 38 | 88 | 3¾ | 92 |
| 76 | 66 | 4½ | 77 |
| 120 | 48 | 6⅝ | 61 |
| 152 | 22 | 7½ | 72 |
| 200 | 0 | 17 | 39 |

An extremely high acid number is not desirable for metal coating. A suitable range of glycol is 35 to 98 percent and 65 to 2 percent (by weight) of glycerine.

By varying the relative proportions of rosin, fatty acid and maleic anhydride, it is possible to change the properties of the film. Increasing the relative amount of rosin increases the hardness of the film and also improves the metal adhesion. Incorporation of the fatty acid imparts flexibility to the film, while the maleic anhydride, in addition to contributing some hardness, provides unsaturation for cross-linking by the vinyl monomer. Consequently, different combinations of relative proportions will give different types of films. To obtain the desired properties in the film a definite combination was determined. Not much variation is permitted before the properties are definitely changed. The following ranges are preferred.

Percentage by weight
Rosin ------------------------------- 20 to 60
Maleic anhydride -------------------- 20 to 30
Fatty acids ------------------------- 60 to 10

The following table will show the preferred range of ingredients employed in the preparation of a coating material.

| Alcohols | | Acids | | |
|---|---|---|---|---|
| Per Cent by weight Glycol | Per Cent by weight Glycerine | Per Cent by weight Rosin | Per Cent by weight Maleic Anhydride | Per Cent by weight Fatty Acids |
| 35 to 98 | 65 to 2 | 20 to 60 | 20 to 30 | 60 to 10 |

The ratio of the weight of alcohol to the weight of acid should preferably be such that there are equal quantities of hydroxyl and carboxyl groups.

This should be borne in mind when making batches in accordance with Example II where ranges of ingredients are given.

It is to be understood that the preferred formulations of this invention include the reaction product of (1) a resin, such as rosin or ester gum, (2) unsaturated dibasic acids or unsaturated dibasic anhydrides, (3) fatty oil acids or fatty acids, (4) a dihydroxy alcohol, and (5) a polyhydroxy alcohol having more than two hydroxyl groups. While some latitude of molecular quantities employed in the formation of the reaction is permitted, it is preferred to use the quantities set forth in Example I. Variations in parts by weight up to 10% provide acceptable products for metal coating purposes. With reference to the use of polyfunctional alcohols, it is preferred to use trihydroxy and tetrahydroxy alcohols.

The modified alkyd resin has good coating properties. However, in combination with a vinyl monomer, such as styrene, or styrene and methyl methacrylate or the like, the modified alkyd resin has substantially improved coating properties, as for example, a much quicker drying time.

Modifications of this invention will be apparent to those skilled in the art without departing from the spirit thereof, and it is desired to be limited only by the scope of the appended claims.

I claim:

1. The process of forming a coating composition which comprises, condensing approximately 4.0 moles of rosin with approximately 6.0 moles of maleic anhydride to form a tribasic acid, adding approximately 2.0 moles of linseed oil fatty acids, approximately 6.4 moles of diethylene glycol and approximately 2.0 moles of glycerine thereto and causing a reaction to occur, and stopping the reaction before the formation of a gel.

2. A composition of matter comprising styrene and the ungelled reaction product obtained by forming a tribasic acid from 1200 parts by weight of rosin and 600 parts by weight of maleic anhydride, and thereafter reacting said tribasic acid with 600 parts by weight of linseed oil fatty acids, 600 parts by weight of diethylene glycol, and 250 parts by weight of glycerine, the ratio of parts by weight of said reaction product to said styrene being approximately 2 to 3.

3. A coating composition comprising a readily copolymerizable vinyl monomer and the ungelled product obtained by reacting 1200 parts by weight of rosin with 600 parts by weight of maleic anhydride to form a tribasic acid, and thereafter reacting said tribasic acid with 600 parts by weight of linseed oil fatty acid, 600 parts by weight of diethylene glycol, and 250 parts by weight of glycerine, the ratio of the parts by weight of said product to said vinyl monomer being approximately one part of said product to about 1 to 3 parts of said monomer.

4. A metal coating composition comprising the ungelled product obtained by reacting 1080 to 1320 parts by weight of rosin with 540 to 660 parts by weight of maleic anhydride, and thereafter reacting the resulting material with 540 to 660 parts by weight of linseed oil fatty acids, 540 to 660 parts by weight of diethylene glycol, and 225 to 275 parts by weight of glycerine.

5. A metal coating composition comprising a readily copolymerizable vinyl monomer and the product of claim 4.

6. A coating composition comprising the ungelled product obtained by condensing approximately 4.0 moles of rosin with about 6.0 moles of maleic anhydride and thereafter reacting the resulting material with approximately 2.0 moles of linseed oil fatty acids, approximately 6.4 moles of diethylene glycol, and approximately 2.2 moles of glycerine.

7. As a new composition of matter, the ungelled product obtained by reacting a resin of the group consisting of rosin, ester gum, and methyl abietate with an alkyd forming compound of the group consisting of aliphatic unsaturated dicarboxylic acids and anhydrides thereof, and thereafter reacting the resulting material with a fatty acid of the group contained in vegetable oils, an alkyd forming dihydroxy alcohol, and an alkyd forming polyhydroxy alcohol having more than two hydroxyl groups, said reactants being employed in the following percentages by weight:

Acid constituents:                                   Per cent
  Resin _____ 20 to 60
  Selected alkyd forming compound__ 20 to 30
  Selected fatty acid_____ 60 to 10
Alcohol constituents:
  Alkyd forming dihydroxy alcohol___ 35 to 98
  Alkyd forming polyhydroxy alcohol_ 65 to 2 the ratio of the weight of said alcohol constituents to the weight of said acid constituents being such that there are equal quantities of hydroxyl and carboxyl groups.

8. A metal coating composition comprising approximately one part of the product of claim 7 and approximately one to three parts of a readily copolymerizable vinyl monomer.

9. A method of making a coating composition comprising reacting a resin of the group consisting of rosin, ester gum, and methyl abietate with an alkyd forming compound of the group consisting of aliphatic unsaturated dicarboxylic acids and anhydrides thereof, reacting the resulting material with a fatty acid of the group contained in vegetable oils, an alkyd forming dihydroxy alcohol, and an alkyd forming polyhydroxy alcohol containing more than two hydroxyl groups, and stopping the reaction before the formation of a gel, said reactants being present in the following percentages by weight:

Acid constituents:                                   Per cent
  Resin _____ 20 to 60
  Selected alkyd forming compound__ 20 to 30
  Selected fatty acid_____ 60 to 10
Alcohol constituents:
  Alkyd forming dihydroxy alcohol___ 35 to 98
  Alkyd forming polyhydroxy alcohol_ 65 to 2 the ratio of the weight of said alcohol constituents to the weight of said acid constituents being such that there are equal quantities of hydroxyl and carboxyl groups.

HAROLD E. ADAMS.

REFERENCES CITED

The following references are of record in the file of this patent:

UNITED STATES PATENTS

| Number | Name | Date |
|---|---|---|
| 1,975,959 | Lawson et al. | Oct. 9, 1934 |
| 2,033,133 | Ellis | Mar. 10, 1936 |
| 2,063,542 | Ellis | Dec. 8, 1936 |
| 2,381,486 | Cohen et al. | Aug. 7, 1945 |
| 2,407,479 | D'Alelio | Sept. 10, 1946 |

FOREIGN PATENTS

| Number | Country | Date |
|---|---|---|
| 770,203 | France | Sept. 11, 1934 |